United States Patent [19]
Chida

[11] Patent Number: 5,675,393
[45] Date of Patent: Oct. 7, 1997

[54] IMAGE PROCESSING APPARATUS WITH GENERATING UNIT FOR GENERATING IMAGE DATA AND DECODING UNIT FOR DECODING IMAGE DATA

[75] Inventor: Makoto Chida, Kawasaki, Japan

[73] Assignee: Canon Kabushiki Kaisha, Tokyo, Japan

[21] Appl. No.: 440,975

[22] Filed: May 15, 1995

Related U.S. Application Data

[62] Division of Ser. No. 972,203, Nov. 5, 1992, abandoned.

[30] Foreign Application Priority Data

Nov. 7, 1991 [JP] Japan .................. 3-291695

[51] Int. Cl.⁶ .................. H04N 5/265
[52] U.S. Cl. .................. 348/598; 348/15; 348/17; 348/584; 348/420
[58] Field of Search .................. 348/15–19, 12–14, 348/10, 21, 6, 588, 584, 585, 581, 580, 598, 599, 578, 705, 400, 420, 421, 402, 409

[56] References Cited

U.S. PATENT DOCUMENTS

| | | | |
|---|---|---|---|
| 4,864,388 | 9/1989 | Skrydstrup | 348/584 |
| 5,157,491 | 10/1992 | Kassatly | 358/146 |
| 5,159,453 | 10/1992 | Dhein et al. | 348/598 |
| 5,247,372 | 9/1993 | Tsutameri et al. | 348/448 |
| 5,408,274 | 4/1995 | Chang et al. | 348/700 |

*Primary Examiner*—John K. Peng
*Assistant Examiner*—Nathan J. Flynn
*Attorney, Agent, or Firm*—Fitzpatrick, Cella, Harper & Scinto

[57] ABSTRACT

An image processing apparatus including an input unit for inputting a plurality of coded image data from a plurality of external devices, a generating unit for generating image data for one image plane by composing the plurality of coded image data inputted by the input means without decoding the plurality of coded image data, and a decoding unit for decoding the image data for one image plane generated by the generating unit.

9 Claims, 15 Drawing Sheets

FIG. 5A

| FRAME \ BIT NUMBER OF SERVICE CHANEL OF EACH FRAME | 1 | 2 | 3 | 4 | 5 | 6 | 7 | 8 |
|---|---|---|---|---|---|---|---|---|
| EVEN NUMBER FRAME | $X_{EVEN}$ | 0 | 0 | 1 | 1 | 1 | 1 | 1 |
| ODD NUMBER FRAME | $X_{odd}$ | 1 | A | E | $C_1$ | $C_2$ | $C_3$ | $C_4$ |

FIG. 5B

| FRAME NUMBER | 1 | 3 | 5 | 7 | 9 | 11 | 13 | 15 |
|---|---|---|---|---|---|---|---|---|
| $X_{odd}$ | $N_1$ | $N_2$ | $N_3$ | $N_4$ | $N_5$ | $R_1$ | $R_2$ | TEA |

FIG. 5C

| FRAME NUMBER | 0 | 2 | 4 | 6 | 8 | 10 | 12 | 14 |
|---|---|---|---|---|---|---|---|---|
| $X_{EVEN}$ | 0 | 0 | 1 | 0 | 1 | 1 | $R_3$ | $R_4$ |

FIG. 6A

| BIT NUMBER | $b_0$ | $b_1$ | $b_2$ | $b_3$ | $b_4$ | $b_5$ | $b_6$ | $b_7$ |
|---|---|---|---|---|---|---|---|---|
| BAS CONTENT | ATTRIBUTE | | | ATTRIBUTE VALUE | | | | |

FIG. 6B

| $b_0$ | $b_1$ | $b_2$ | COMMAND OR CAPACITY |
|---|---|---|---|
| 0 | 0 | 0 | AUDIO CODING COMMAND |
| 0 | 0 | 1 | TRANSFER RATE COMMAND |
| 0 | 1 | 0 | VIDEO AND OTHER COMMAND |
| 0 | 1 | 1 | DATA COMMAND |
| 1 | 0 | 0 | TERMINAL CAPACITY 1 |
| 1 | 0 | 1 | TERMINAL CAPACITY 2 |
| 1 | 1 | 0 | UNDEFINITION |
| 1 | 1 | 1 | ESCAPEMENT CODE |

FIG. 11A

CIF

| 1 | 2 |
|---|---|
| 3 | 4 |
| 5 | 6 |
| 7 | 8 |
| 9 | 10 |
| 11 | 12 |

FIG. 11B

QCIF

| 1 |
|---|
| 3 |
| 5 |

FIG. 12A

| QCIF(A) | QCIF(B) |
|---------|---------|
| QCIF(C) | QCIF(D) |

FIG. 12B

| DISPLAY POSITION | GN CONVERSION METHOD |
|---|---|
| QCIF(A) | 1 +0→ 1<br>3 +0→ 3<br>5 +0→ 5 |
| QCIF(B) | 1 +1→ 2<br>3 +1→ 4<br>5 +1→ 6 |
| QCIF(C) | 1 +6→ 7<br>3 +6→ 9<br>5 +6→ 11 |
| QCIF(D) | 1 +7→ 8<br>3 +7→ 10<br>5 +7→ 12 |

IMAGE PROCESSING APPARATUS WITH GENERATING UNIT FOR GENERATING IMAGE DATA AND DECODING UNIT FOR DECODING IMAGE DATA

This application is a division of application Ser. No. 07/972,203 filed Nov. 5, 1992 now abandoned.

BACKGROUND OF THE INVENTION

1. Field of the Invention

The invention relates to a receiving apparatus which is connected to a plurality of lines and receives a video image or the like.

2. Related Background Art

In the case of using an analog telephone line which has conventionally been known, digital data can be transmitted only at a low speed.

In recent years, however, in association with the advancement of the communication technique, semiconductor technique, and optical technique, digital lines are installed and a large capacity of data can be transmitted at a high speed.

Particularly, the digital transmission has features such that deterioration of the quality of the transmission does not occur, the quality of the same level is maintained, there is no need to use a transmission line according to the characteristics of a medium of transmission data, the media can be integrated, and the like. Thus, digital data can be transmitted among compound medium terminals. Consequently, a telephone terminal which can also simultaneously transmit a video image from a conventional telephone of only a voice has been put into practical use.

Under such a situation, an international standardization by CCITT or the like is progressing so as to enable mutual communication to be executed even among a plurality of different terminals. For AV (Audio Visual) services such as television telephone, television conference system, or the like using digital lines, service provisions for AV services, protocol provisions, and multimedium multiplex frame construction provisions have been proposed as CCITT Recommendation (or draft) H. 320, H. 242, H. 221, or the like.

In the aforementioned H. 221, a frame construction in the AV services in a range from 64 kbps to 1920 kbps, exchange of terminal capacities, and code allocations of FAS (Frame Alignment Signal) and BAS (Bit Allocation Signal) in the communicating mode are defined. In the H. 242, protocols of the capacity exchange, communicating mode switching, and the like among the AV terminals using BAS are defined. In the H. 320, a system aspect of the whole AV services is defined.

In the above recommendation or recommendation draft, there is defined a method of executing multimedium communication of image, voice, data, or the like among terminals by a procedure such as exchange sequence of the terminal capacity using the BAS in the in-channel, mode change-over sequence by the designation of the communicating mode, or the like after completion of the setting of a physical connection of the end-to-end and the setting of the synchronization by the FAS in the in-channel.

However, a definition in the case where the self terminal capacity is changed in each terminal in accordance with the situation or a definition regarding which communicating mode is used in a range of the exchanged capacity is out of the scope of the provisions.

An information transfer speed of each medium in the multimedium communication is determined by designating an audio coding method as for audio information. In case of data information, the information transfer speed is decided by designating whether the data information is used or not and by designating the transfer speed in case of using the data information. The transfer speed of audio information and the transfer speed of data information are subtracted from the information transfer speed of the whole communication line which has been set. The remainder results in the transfer speed of image information.

However, according to the multimedium terminal of the conventional apparatus, only a mutual communication with one other terminal can be performed. In the case of considering mutual communication with a plurality of locations (multipoints), it is obviously necessary to provide a plurality of line units. When an image and a voice are communicated, further, since there is a limit of the communication capacity of the communication line, coding and decoding processes are executed to compress and expand data. For this purpose, it is also necessary to provide image decoding units of only the number of as many terminals which mutually communicate.

In the transmission of information, since an amount of audio data is also smaller than that of image data, a plurality of decoding units for the audio data can be realized without largely increasing the costs.

In case of the image, however, since the algorithm is also complicated and the data amount is also large, its circuit scale is fairly large and arithmetic operating processes need to be executed at a high speed. On the other hand, since a memory capacity which is used is also extremely large, although a plurality of same image decoding units can be provided, such a construction is not so practical when considering an economical viewpoint.

As mentioned above, when considering the mutual communication with multipoints, the line units of the same number and the audio/image decoding units of the same number as only the number of terminals which simultaneously communicate are obviously necessary. Further, to communicate with multipoints, the transmission capacity also increases, so that it is necessary to efficiently transmit each medium.

However, means for informing that the apparatus is connected to the multipoints is not provided as a standard function for the transmitting terminal. If such a function is added, such a function can be used only by the special terminals.

When the transmitting terminal does not know that the partner terminal is connected to multipoints, vain data is transferred. For instance, when the screen is divided into four regions and video images at four positions are simultaneously monitored, an amount of data transmitted as a video image of the full size is reduced to ¼ so long as it is displayed on the ¼ screen region, so that fairly vain data is transmitted.

Further, when the image data is received from a plurality of terminals, the image data is generally processed and synthesized on a frame unit basis. In the case where the transfer rate of frames differs on every terminal, the image data of each frame lacks and the decoding unit operates erroneously.

Moreover, when the image data is received from a plurality of terminals, so long as the number of terminals which simultaneously communicate is smaller than the number of terminals which is equal to the number of lines, in the case where the image data is processed and synthesized on a frame unit basis, the image data lacks and the decoding unit operates erroneously.

SUMMARY OF THE INVENTION

It is an object of the invention to provide a receiving apparatus which can solve the above problems.

Another object of the invention is to provide a receiving apparatus which can simultaneously communicate with terminals at multipoints without having a plurality of image decoding units.

Still another object of the invention is to provide a receiving apparatus which can communicate with ordinary terminals at multipoints.

Further, another object of the invention is to provide a receiving apparatus which can easily synthesize a screen even when a transfer rate of frame differs at every terminal and in which no erroneous operation occurs even in a decoding unit.

Further, another object of the invention is to provide a receiving apparatus in which even in the case where the number of terminals which simultaneously communicate is smaller than the number of lines, a lack amount is easily interpolated, thereby preventing a decoding unit from operating erroneously.

To accomplish the above object, according to a preferred embodiment of the invention, there is disclosed a terminal apparatus which can perform mutual communication with a plurality of terminals which communicate video data, wherein the apparatus comprises: receiving means for receiving coded video image data from the plurality of terminals; means for synthesizing the video data received by the receiving means without decoding and for producing data of one screen; and means for decoding the produced data of one screen.

Further, another object of the invention is to provide a receiving apparatus having a novel function.

Further, another object of the invention is to provide a receiving apparatus which can freely change control data accompanied in image data received.

The above and other objects and features of the present invention will become apparent from the following detailed description and the appended claims with reference to the accompanying drawings.

BRIEF DESCRIPTION OF THE DRAWINGS

FIGS. 5A to 5C are diagrams showing bit constructions of FAS;

FIGS. 6A and 6B are diagrams showing bit constructions of BAS;

FIGS. 11A and 11B are diagrams showing CIF and QCIF formats;

FIGS. 12A and 12B are diagrams showing a GN (GOB Number) conversion method;

DETAILED DESCRIPTION OF THE PREFERRED EMBODIMENTS (Embodiment 1)

Figure 1:
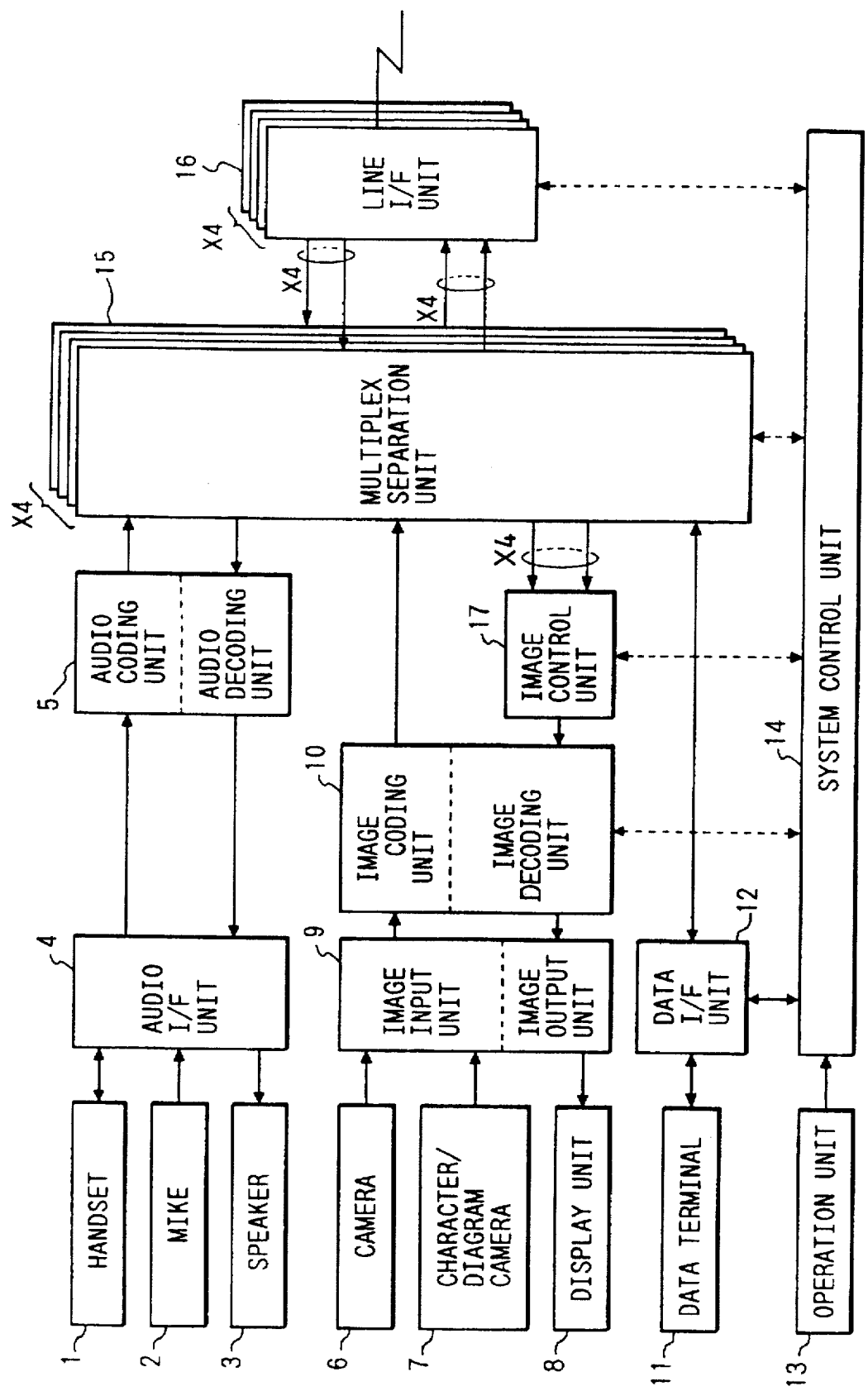
FIG. 1 is a block diagram showing an embodiment of the invention.

FIG. 1 is a block diagram showing a construction of a multimedium terminal according to an embodiment of the invention. In the diagram, reference numeral 1 denotes a handset as one of the audio input/output means of the apparatus; 2 a mike as one of the audio input/output means of the apparatus; 3 a speaker as one of the audio input/output means of the apparatus; and 4 an audio interface (I/F) unit having a function to change over the handset 1, mike 2, and speaker 3 as audio input/output means by an instruction of a system control unit 14, a gain adjusting function to adjust an audio level, an on/off detecting function to detect whether the handset 1 is in the on-hook state or off-hook state, an echo cancelling function to erase an echo when the mike 2 and the speaker 3 are used as audio input/output means, and a tone generating function to generate a dial tone, a call tone, a busy tone, a termination sound, or the like.

Reference numeral 5 denotes an audio coding/decoding unit having a function for A/D converting and coding a transmission audio signal by an instruction of the system control unit 14 in accordance with an audio coding/decoding algorithm such as 64 kbps PCM (A-law), 64 kbps PCM (μ-law), 7 kHz audio (SB-ADPCM), 32 kbps ADPCM, 16 kbps (e.g., APC-AB), 8 kbps, or the like and a function for decoding and D/A converting the reception audio signal.

Reference numeral 6 denotes a camera to supply a self image or the like; 7 a character/diagram camera which is one of the image input means of the apparatus and is used to supply a picture, a drawing, or the like; 8 a display unit to display the input image from the camera 6 or the character/ diagram camera 7, a reception image from a partner side, or an image from the system control unit 14; and 9 an image input/output unit having a function to change over the image input means by an instruction of the system control unit, a display switching and display dividing function of each image mentioned above, and a signal converting function to match with a video signal of each of the image input/output units in an electrical/signal manner.

Reference numeral 10 denotes an image coding/decoding unit having a function for A/D converting and coding a transmission image and a function for decoding and D/A converting a reception image. The image coding/decoding unit 10 executes a band compression to original data of an image of a large capacity by various methods such as movement compensation, frame thin-out, intra-frame compensation and inter-frame compensation, DCT conversion, vector quantization conversion, etc. and reduces the capacity, thereby enabling the image data to be transmitted by a digital line.

Although the basic interface of the ISDN line is set to 64 kbps at present, there is a CCITT recommendation draft H. 261 as a coding method of an image which can be transmitted even at such a transmission speed.

Reference numeral 11 denotes a data terminal to perform a data communication; 12 a data interface unit for notifying transmission data from the data terminal 11 and the system control unit 14 to a multiplex separation unit 15 and for notifying the reception data to the data terminal 11 or system control unit; 13 an operation unit such as keyboard, touch panel, or the like which is used to supply control information to control the apparatus; and 14 the system control unit having a CPU, an ROM, an RAM, an auxiliary memory device, a character generator, an image signal generating circuit, and the like. The system control unit 14 monitors a state of each unit and executes the control of the whole apparatus, the operation according to each state, the formation of a display picture plane, the execution of an application program, and the like.

Reference numeral 15 denotes the multiplex separation unit for multiplexing the audio data from the audio coding/decoding unit 5, image data from the video coding/decoding unit 10, data from the data interface unit 12, and BAS (Bit Allocation Signal) from the system control unit 14 on a transmission frame unit basis and for separating the reception frame to each medium of a construction unit and notifying to each section. There is H. 221 as a CCITT recommendation.

The multiplex separation unit 15 corresponds to a line interface (I/F) unit 16. The line I/F unit 16 controls a line in accordance with an ISDN user network interface. The line I/F unit 16 is constructed by four line I/F units so that they can simultaneously communicate with four terminals. The multiplex separation unit 15 is also constructed by four multiplex separation units in correspondence to the four line I/F units 16.

Reference numeral 17 denotes an image control unit which is peculiar to the embodiment.

A method of performing the negotiation of a terminal capacity and the change of the terminal capacity will now be described. First, in case of communicating by the ISDN line, as shown in FIG. 2, a call is generated by using an out-band signal (namely, D channel).

Figure 2:
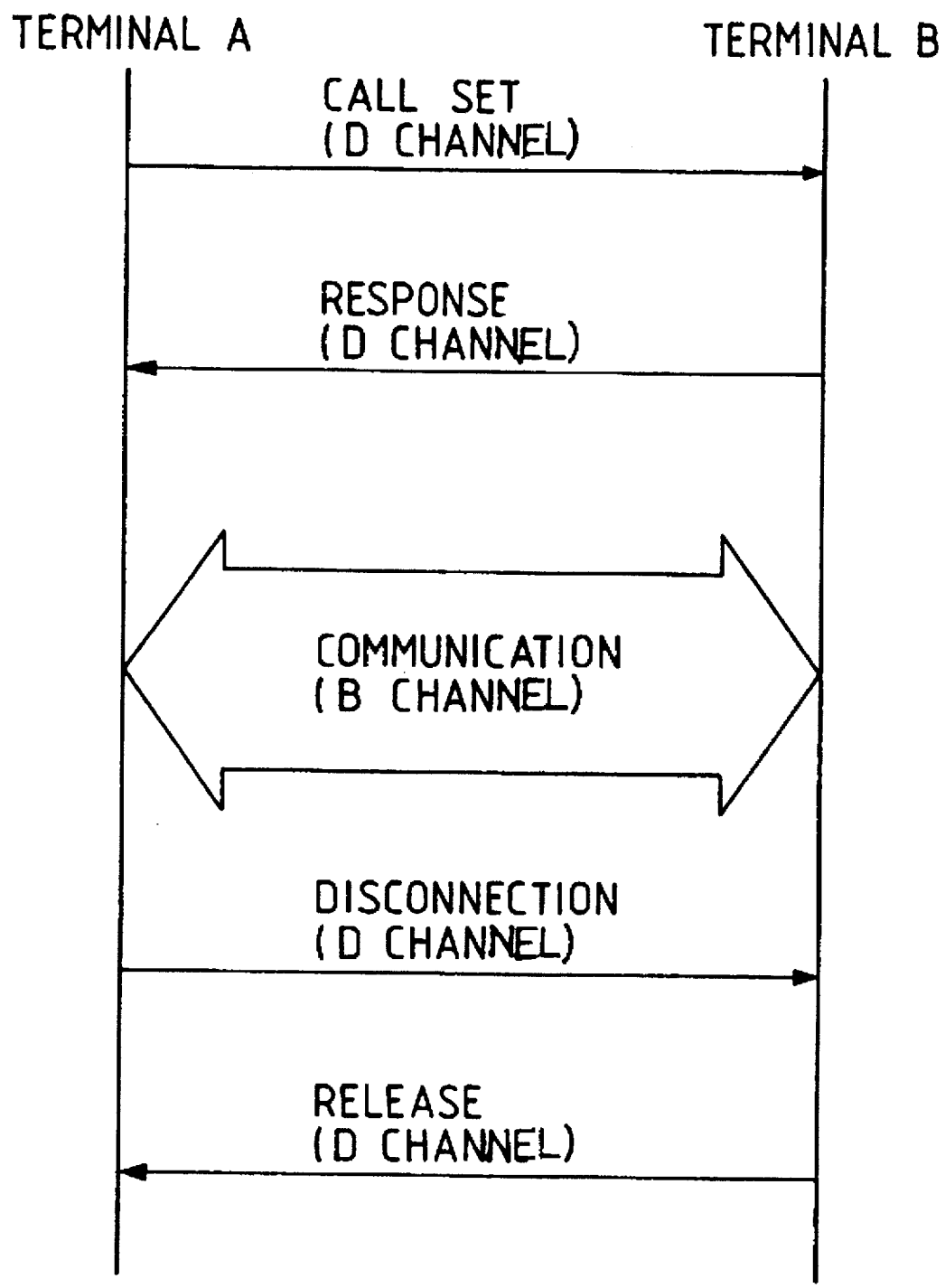
FIG. 2 is a diagram showing a D channel communication procedure.

As shown in FIG. 2, the communication at Bch can be performed by the call setting from a terminal A to a terminal B and by a response from the terminal B to the terminal A. As a communication line, in addition to the Bch, there are Dch, $H_0$ (band of 384 kbps) which is known as a broad band ISDN, $H_1$ (band of 1536 kbps), and the like. However, explanation will be made with respect to only Bch, and the other communication lines are omitted here.

Figure 3:
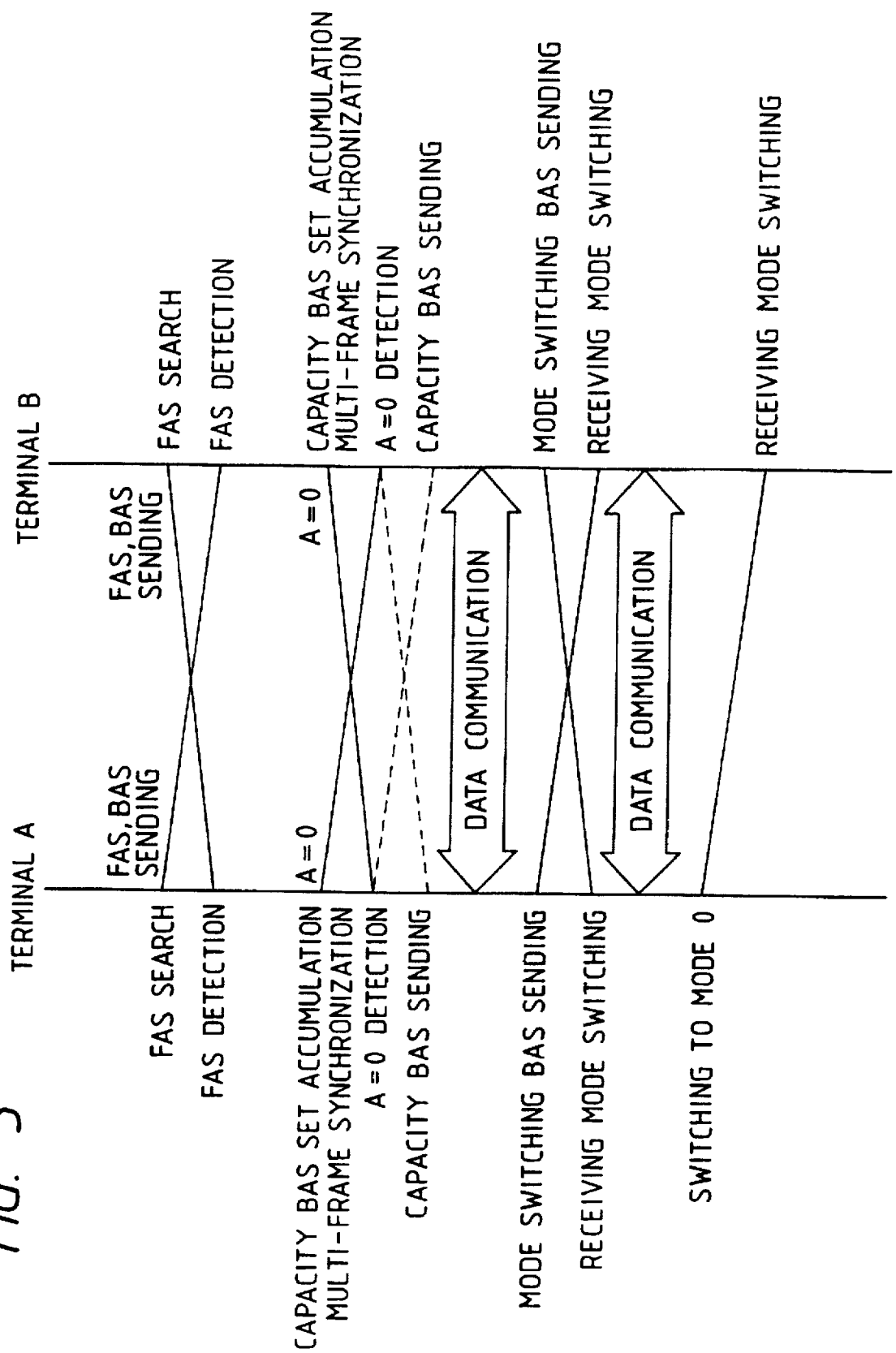
FIG. 3 is a diagram showing an in-channel control of the B channel.

As shown in FIG. 3, an in-band signal procedure of Bch (namely, the inside of Bch is separated to the data portion and the control portion and the control is performed by the control portion) is executed in accordance with the recommendation H. 242 by using Bch which can communicate. Since such a control is called an in-channel control procedure, this denomination is used hereinafter. When the in-channel control is executed, a control bit is needed in Bch, so that the frame construction is specified by H. 221.

FIG. 4 shows the above frame construction. The multiframe structure in FIG. 4 relates to a structure in case of Bch (64 kbps).

Figure 4A:
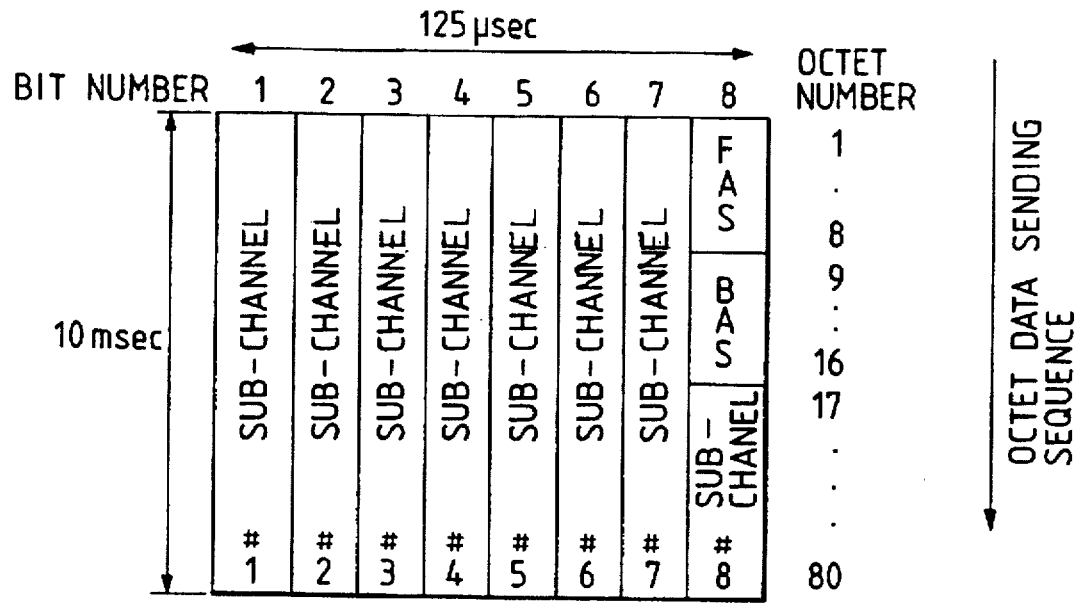
FIGS. 4A to 4C are frame constructional diagrams of CCITT H. 221.
Figure 4B:
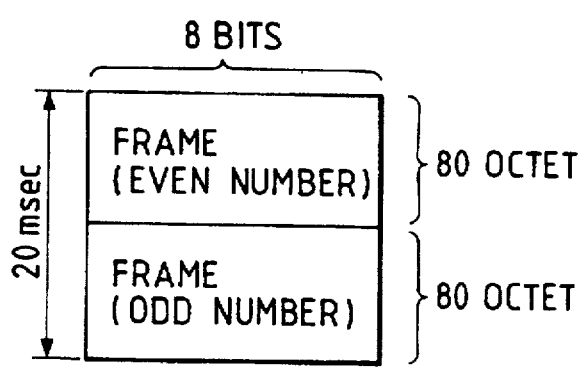
Figure 4C:
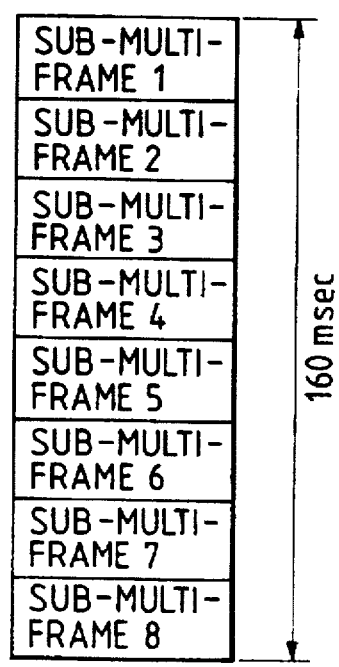

First, the multi-frame structure is based on one octet/125 μsec and has a structure such that 1 frame=80 octets as shown in FIG. 4A, 1 sub-multi frame=2 frames as shown in FIG. 4B, and 1 multi-frame=8 sub-multiframes as shown in FIG. 4C. Sub-channels #1 to #8 of 8 kbps are defined in the bit direction.

In case of only the #8 sub-channel, however, the transfer rate is set to 6.4 kbps and signals of FAS (Frame Alignment Signal) and BAS (Bitrate Allocation Signal) are inserted as control bits.

The in-channel control of Bch can be performed by FAS and BAS. FAS is used for frame and multi-frame synchronization. BAS is used to exchange information of a terminal capacity which is necessary for deciding a multiplexing method of sub-channels or the like or to set a capacity. Particularly, BAS can be switched every sub-multi frame (20 msec) even during the data communication.

A procedure will now be described with reference to FIG. 3.

First, when Bch is set into a state in which the communication can be performed, both of the terminals A and B transmit FAS. The capacity of each terminal in this instance is set to mode 0 (mode of only audio and FAS and BAS) in the initial state. FAS is searched by a partner terminal. When the conditions to establish the frame synchronization specified by H. 242 are satisfied, A in the bit construction in FAS shown in FIG. 5A is set to "0" and is transmitted. When the terminal receives A=0, it is confirmed that the partner terminal has established the frame synchronization.

Subsequently, the transmission capacity of the self terminal is transmitted to the partner terminal by BAS and the terminal capacity of the partner terminal is mutually recognized. That is, the transmission capacities are exchanged.

If both the self terminal and the partner terminal can mutually communicate at this time point, the communication of data is started. When it is necessary to change the capacity, a desired terminal capacity is similarly transmitted as a command by using BAS. After the partner terminal has completely set such a capacity, the data communication is started.

The data communication is independent in the transmitting mode and receiving mode. The establishment of the synchronization and the setting of the terminal capacity are also independently executed, respectively. Therefore, there is also a case where a pull-out (out of synchronization) occurs in only one direction or the kinds of data upon transmission and reception differ.

When the data communication is completed and the call is disconnected, the side (terminal A in FIG. 3) which performs the disconnection first sets to mode 0 by using BAS. Thus, the in-channel control of Bch is returned to the initial state.

Subsequently, as shown in FIG. 2, the disconnection and release are executed by the out-band procedure of Dch and all of the communications are completed.

FIGS. 5A to 5C show bit constructions in FAS.

An A bit indicates whether the frame pull-out has occurred or not. An E bit indicates whether a CRC error has occurred or not. $C_1$, $C_2$, $C_3$, and $C_4$ denote bits of a CRC4. $N_1$ to $N_5$ denote bits for numbering the multi-frame.

$R_1$ to $R_4$ denote bits to indicate channel numbers.

TEA denotes a terminal apparatus alarm. "1" is set into TEA when the terminal receives an input signal due to a failure in the terminal or cannot respond to it.

FIGS. 6A and 6B show bit constructions in BAS.

As shown in FIG. 6A, the upper three bits denote an attribute and the remaining five bits indicate an attribute value of such an attribute.

FIG. 6B shows contents of the attribute. As for the attribute value, for instance, a transfer rate value, a codec type, parameter values which are peculiar to each medium, and the like are defined.

In the embodiment, the line is connected to a plurality of terminals and the apparatus can simultaneously mutually communicate. However, it is necessary to limit the image transmitting capacity for all of the terminals connected in this instance.

Therefore, when the apparatus simultaneously mutually communicates with a plurality of terminals, practically speaking, upon transmission of the capacity BAS shown in FIG. 3, an image format (QCIF or CIF) included in the terminal capacity 2 in FIG. 6B is set into QCIF, thereby enabling only QCIF of the image data to be received from all of the terminals. Although CIF and QCIF will be explained in detail hereinlater, in brief, the number of pixels of QCIF is defined to be ¼ of the number of pixels of CIF. On the other hand, when only one terminal is connected, the ordinary communication is executed. In other words, the transmission and reception can be performed in any of QCIF and CIF.

In the case where the number of terminals connected is changed from a plural number to one, the transmission capacity can also be changed by changing the image format from QCIF to CIF and by transmitting the capacity BAS to such one terminal.

On the contrary, in the case where the number of terminals connected is changed from one to a plural number, the transmission capacity can be also limited by transmitting the capacity BAS in which the image format has been set to QCIF to all of the terminals.

As mentioned above, the terminal which receives an image controls so as to limit the image format which is received from the partner terminal, thereby enabling desired image data to be received from a transmitting terminal.

Figure 7:
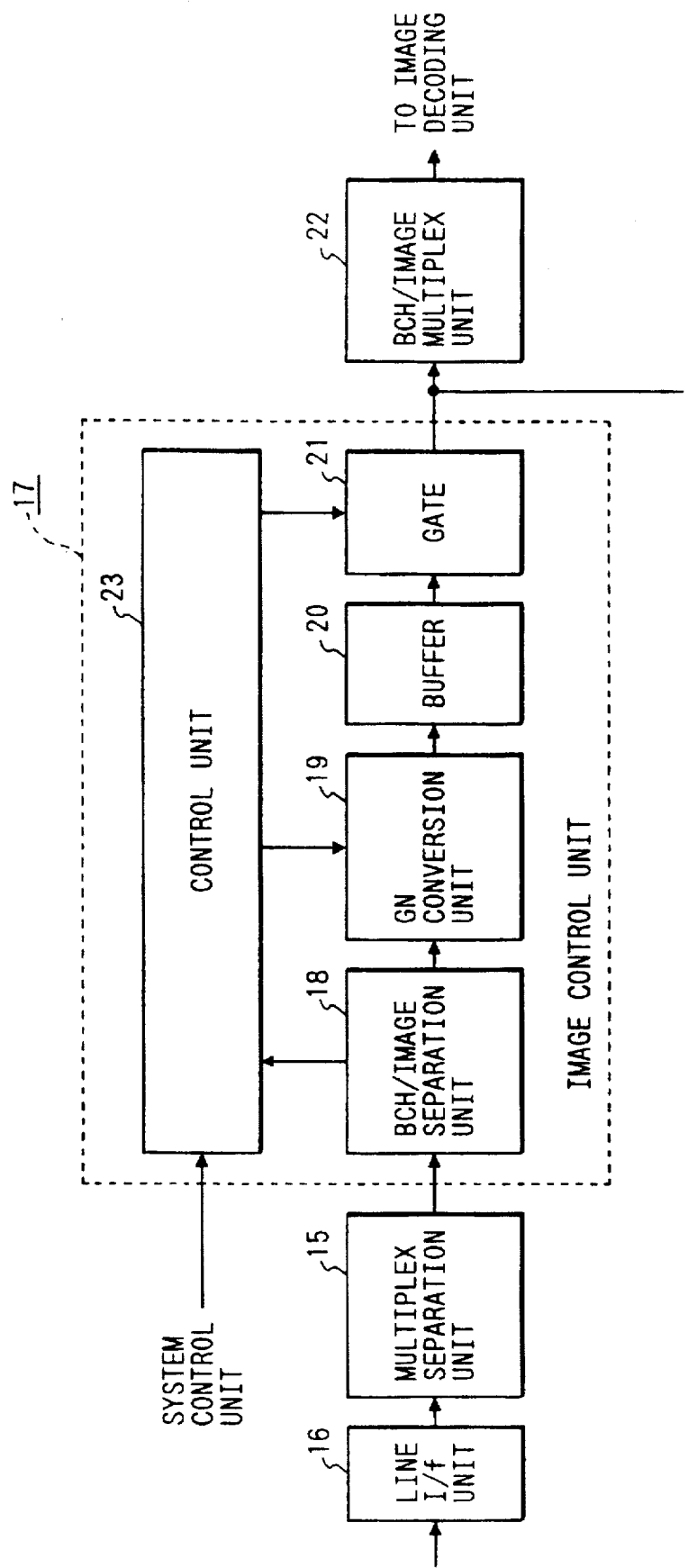
FIG. 7 is a detailed constructional diagram of an image control unit.

FIG. 7 is a block diagram showing an internal construction of the image control unit 17 shown in FIG. 1 and its peripheral section. In the diagram, reference numeral 18 denotes a BCH/image separation unit for executing an error correcting process of BCH to the data received from the multiplex separation unit 15 and for eliminating an error correction frame, thereby obtaining image data. Reference numeral 19 denotes a GN conversion unit for converting a GN (GOB Number) in a GOB header in the image data; 20 a data buffer; 21 a gate unit; 22 a BCH/image multiplex unit for adding a correction parity of BCH to thereby form an error correction frame; and 23 a control unit to control each of the above units by receiving an instruction from the system control unit 14.

Figure 9:
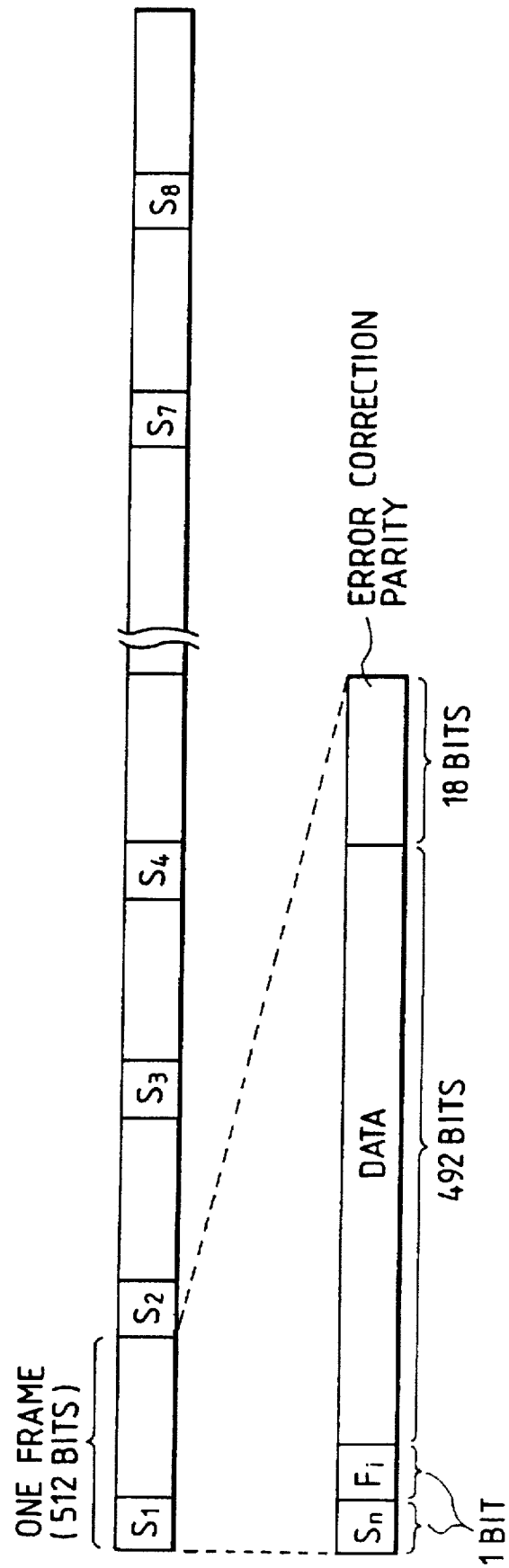
FIG. 9 is a diagram showing a BCH error correction frame.

An error correction frame of a format as shown in FIG. 9 is generated as output data from the multiplex separation unit 15.

One frame is constructed by total 512 bits comprising: an error correction frame bit of one bit; fill identification data of one bit; image data of 492 bits, and an error correction parity of 18 bits. Further, one multi-frame is constructed by eight frames.

The BCH/image separation unit 18 performs the synchronization of the multi-frame by the error correction bit and executes the error correcting process to the image data by the error correction parity and discriminates whether the image data is valid or invalid by the fill identification data. When the image data is valid, the image data is transferred to the GN conversion unit 19.

Figure 10A:
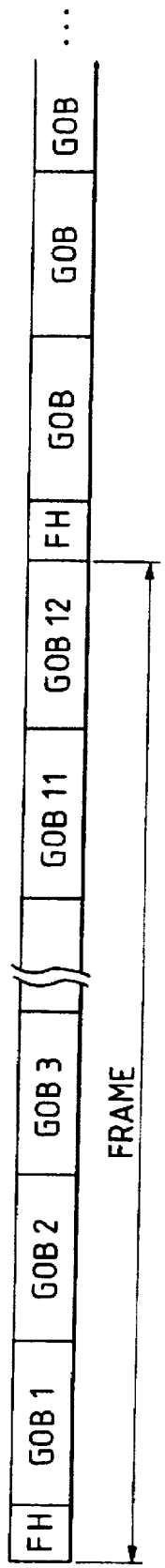
FIGS. 10A and 10B are diagrams showing image data multiplex frames.

The GN conversion unit 19 decodes the content of the received image data. The image data has a multiplex frame construction as shown in FIG. 10A. As shown in FIG. 10A, FH (free header) is arranged in the head of the data of one frame of the picture plane. The picture plane is divided into twelve blocks $GOB_1$ to $GOB_{12}$. Those blocks are sequentially transmitted.

FIGS. 11A and 11B show a dividing method of the GOB.

In the H. 261 recommendation draft, as standards of video signals which are handled, there are a plurality of different standards such as NTSC, PAL, digital television standard, and the like. Therefore, the video signal format which is common in the world is used so that the communication can be mutually performed. Such a common format is called a CIF format and is specified such that the number of samples of a luminance Y is set to 352 pixels×288 lines and the number of samples of each of color differences Cr and Cb is set to 176 pixels×144 lines. Further, ¼ of the CIF is called a QCIF format and is specified such that the number of samples of the luminance Y is set to 176 pixels×144 lines and the number of samples of each of the color differences Cr and Cb is set to 88 pixels×72 lines.

The GOB is defined such that the number of samples of the luminance Y is set to 176 pixels×48 lines and the number of samples of each of the color differences Cr and Cb is set to 88 pixels×24 lines. Those numbers are equal to $\frac{1}{12}$ of those in case of CIF and ⅓ of those in case of QCIF.

As shown in FIG. 11, in case of CIF, $GOB_1$ to $GOB_{12}$ are allocated as numbers of GOB. In case of QCIF, $GOB_1$, $GOB_3$, and $GOB_5$ are allocated as numbers of GOB.

Figure 10B:
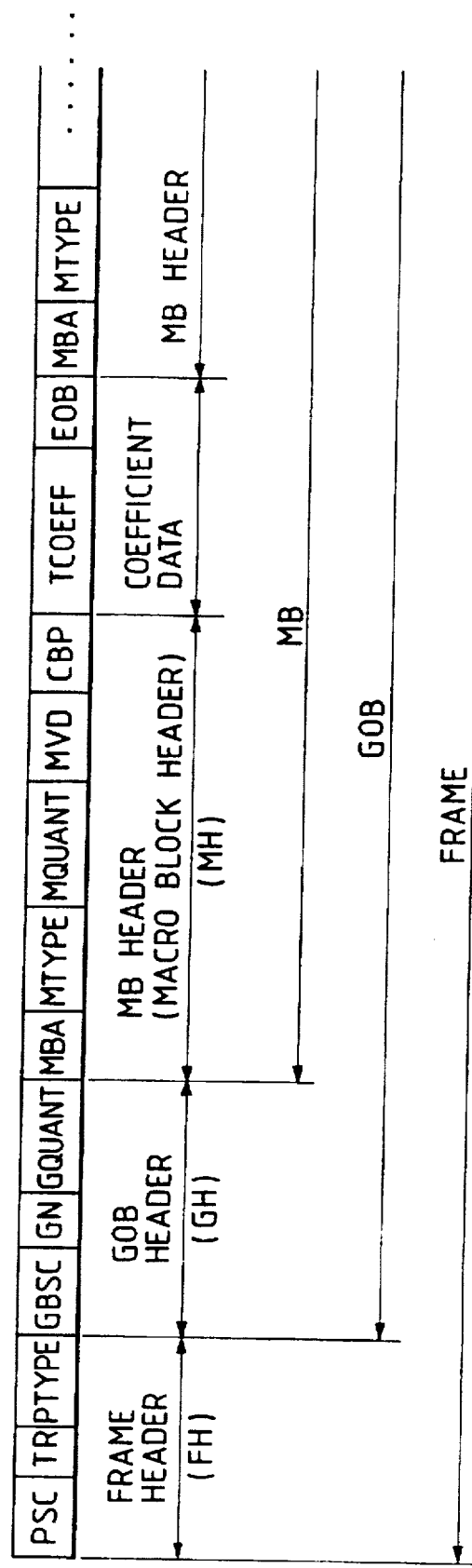

FIG. 10B shows the contents of the FH (frame header) and GOB in FIG. 10A. The FH (frame header) is constructed by PSC, TR, and PTYPE. PSC denotes a frame start code and consists of "0000 0000 0000 0001 0000" of 20 bits. TR denotes a frame number and uses the values of "1" to "30" of five bits. PTYPE denotes type information (six bits) including split/screen instruction information, character/diagram camera instruction information, and information indicative of the freezing/release of the picture plane.

The GOB header is constructed by GBSC, GN, AND GQUANT. GBSC denotes a GOB start code and consists of "0000 0000 0000 0001" of 16 bits. GN denotes a GOB number consisting of four bits and uses the values of "1" to "12". When GN is equal to "0", since it is used in the PSC, it is possible to regard such that both of PSC of FH and (GBSC+GN) of GOB have continuous values of 20 bits. GQUANT denotes quantization characteristic information consisting of five bits and includes information of a quantization step size.

An MB header is a header of the pixel block called a macro block (hereinafter, referred to as MB). One GOB is constructed by 33 MB. One MB is constructed by four luminance signals (Y) each consisting of 8 pixels×8 lines and two color difference signals (Cb, Cr) each consisting of 8 pixels×8 lines.

As a number of each block, 1 to 4 are allocated to Y, 5 is allocated to Cb, and 6 is allocated to Cr. The MB header is constructed by MBA, MTYPE, MQUANT, MVD, and CBP.

MBA denotes a macro block address indicative of the position of MB. Only the head MB denotes the absolute value and the subsequent MB denotes a differential variable length code. MTYPE denotes type information of MB. A processing type such as INTRA (intra-frame coding), INTER (inter-frame differential coding), MC (inter-frame differential coding with movement compensation), FIL (filter), or the like which has been used to process the data of MB is inserted in MTYPE. MQUANT denotes substantially the same quantizing characteristic information as GQUANT.

MVD denotes movement vector information. CBP denotes a significant block pattern including information of the number of four Y of MB mentioned above and the number of valid pixel blocks between Cr and Cb. After the MB header, the compressed coded image data, namely, the pixel blocks as significant blocks among four Y and Cr and Cb are sequentially inserted in accordance with the order of the number as mentioned above.

Each of the PSC of FH and the GBSC and GN of GOB has a unique data pattern such as not to exist in the other data so that the FH or the header of GOB can be searched on the decoder side.

The GN conversion unit 19 shown in FIG. 7 has functions for searching GBSC of the image data multiplex frame shown in FIG. 10A, for decoding GN after GBSC, and for replacing the value of GN to another value.

The data buffer 20 stores the image data from the GN conversion unit 19 and asynchronizes the transfer timing. The image data is transferred to the BCH/image multiplex unit 22 at a timing of the gate unit 21. The BCH/image multiplex unit 22 returns the image data to the error correction frame shown in FIG. 9 and transfers to the image decoding unit 10 (refer to FIG. 1).

Figure 8:
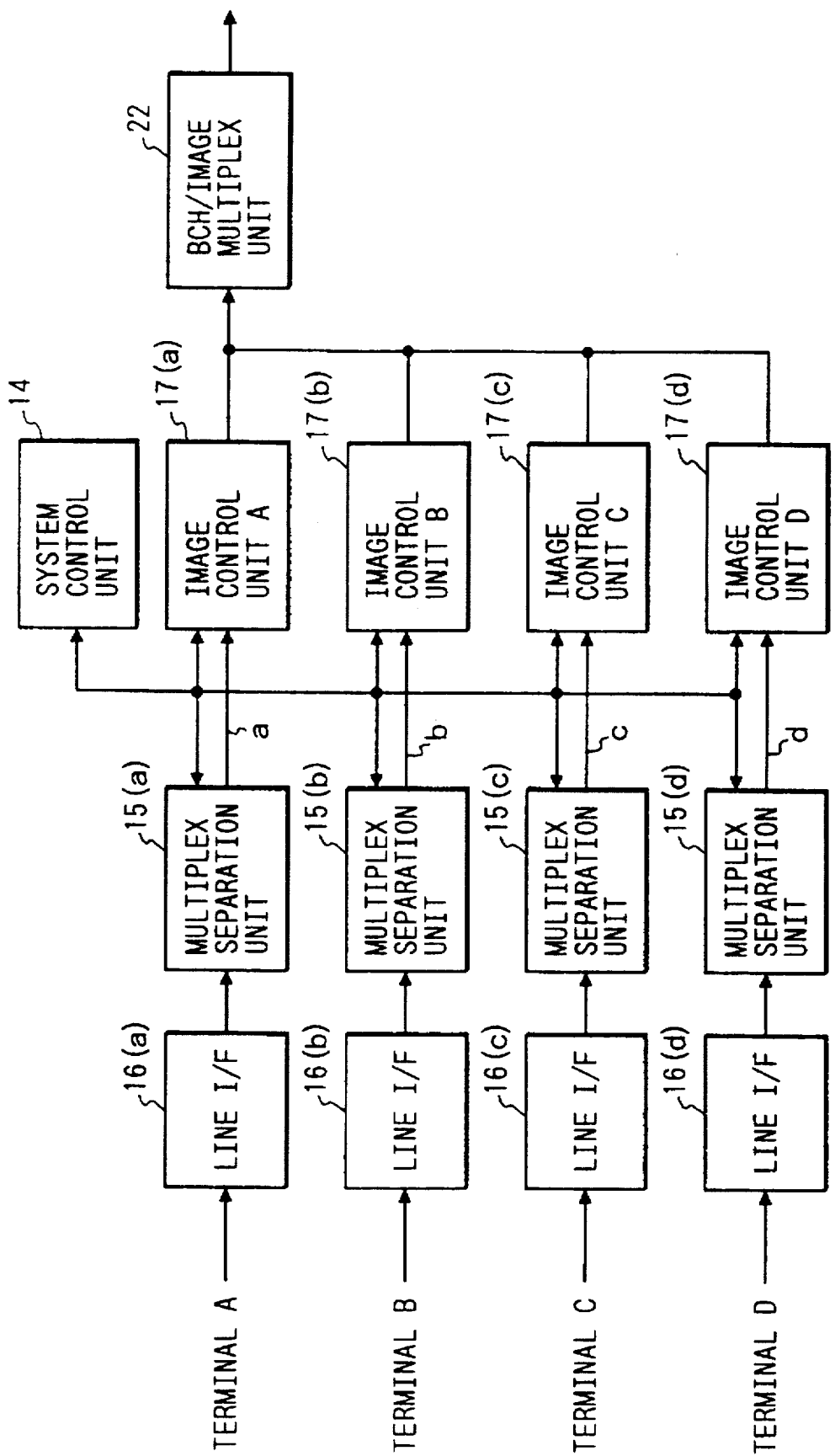
FIG. 8 is a unit constructional diagram of the image control unit.

FIG. 8 shows a construction in the case of simultaneously receiving the image data from four terminals by using a plurality of image control units 17 mentioned above. In the diagram, with respect to the reception image data from the terminal A, the same processes as those mentioned above are executed by a line interface unit 16(a), a multiplex separation unit 15(a), and image control unit 17(a) because a construction similar to that shown in FIG. 7 is used. Similar processes are also performed to the reception image data from each of terminals B, C, and D. Therefore, the reception data from the terminals can be simultaneously processed in parallel.

When the transmission capacity from each terminal is exchanged, the image reception transmission capacity of the self terminal is sent as QCIF to the partner terminal. The self terminal receives the image data in the format of GCIF from the partner terminal. As shown in FIG. 12A, the apparatus is reconstructed in a manner such that four QCIF received from four terminals are enclosed in CIF.

For this purpose, the position on the CIF screen at which the image from each terminal is displayed is instructed from the system control unit 14 shown in FIG. 8 to each of the image control units 17(a) to 17(d). Each image control unit allows the GN conversion unit 19 to convert the value of GN in accordance with the instruction.

For instance, when displaying to QCIF(A) in FIG. 12A, the GN value is not converted as shown in FIG. 12B. In case of QCIF(B), the GN value is replaced with the value in which +1 is added to all of the present GN values. Similarly, in case of QCIF(C), the GN value is replaced with the value in which +6 is added to all of the present GN values. In case of QCIF(D), the GN value is replaced with the value in which +7 is added to all of the present GN values. Such a conversion of the GN value will be clarified from the GN values shown in FIGS. 11A and 11B.

The image data of each QCIF in which the GN value was converted is stored into each buffer unit and is time-division multiplexed by each gate unit, so that the image data multiplex frame of CIF is obtained.

Figure 13:
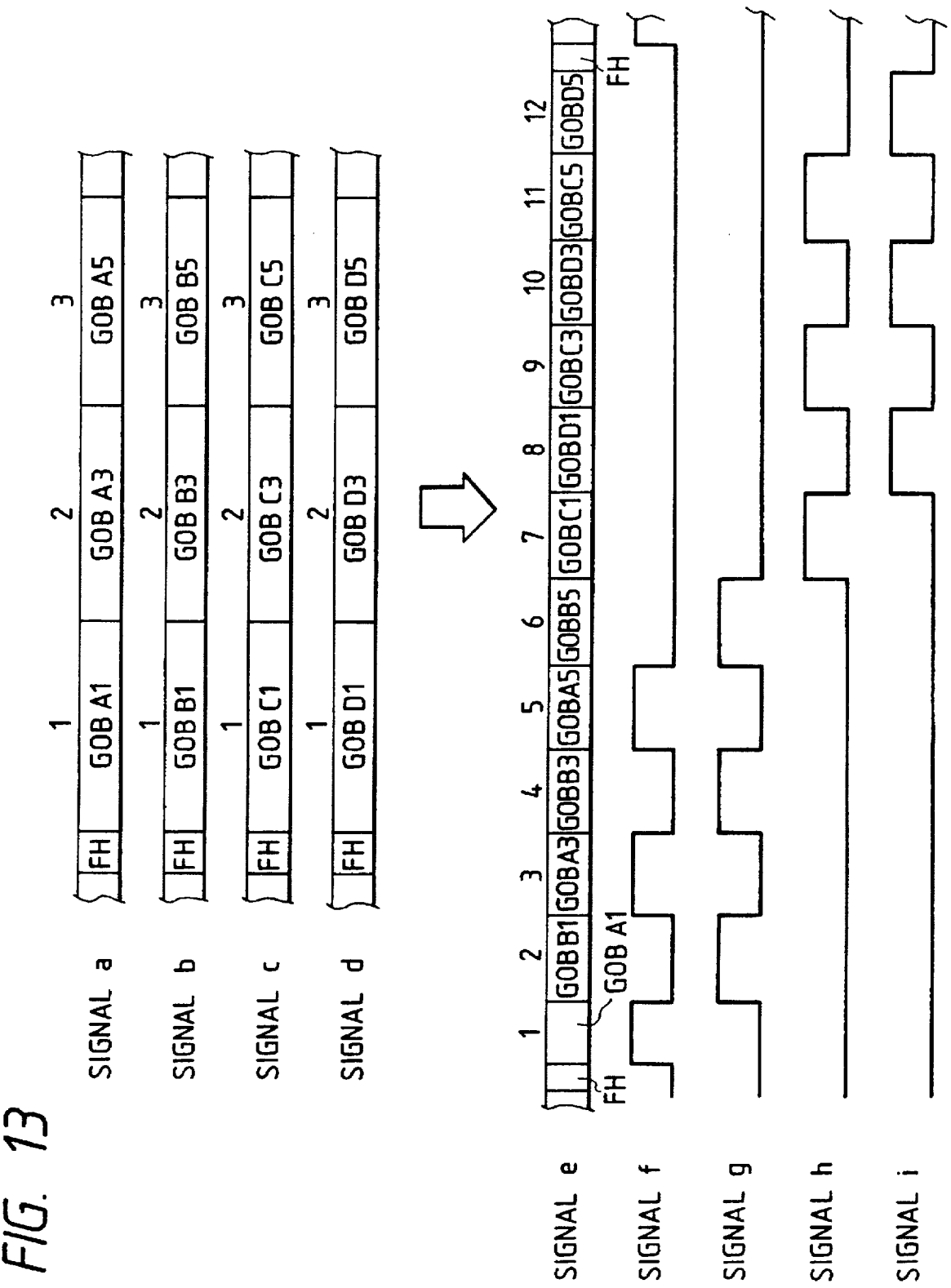
FIG. 13 is a timing chart showing the operation of the image control unit.

FIG. 13 shows the operation of the gate unit. Signals a, b, c, and d denote image data from the BCH/image separation units 18 included in the image control units 17. Since the received image data is QCIF, it is constructed by FH and three GOB. That image data is GN converted as instructed and stored into the buffers.

FIG. 13 shows an example to display the terminal A to QCIF(A) in FIG. 12A, the terminal B to QCIF(B), the terminal C to QCIF(C), and the terminal D to QCIF(D), respectively.

Signals f, g, h, and i shown in FIG. 13 denote ON/OFF signals of the gate units 21 included in the image control units A, B, C, and D (refer to FIG. 8). That is, when the ON/OFF signal is set to the high (H) level, the gate is opened. When it is set to the low (L) level, the gate is closed. By controlling such an ON/OFF signal, GOB of QCIF of each terminal is multiplexed as shown in a signal e and 12 GOB of CIF are obtained and sent to the BCH/image multiplex unit 22.

The image decoding unit 10 decodes the image data as a format of CIF. The decoded image is displayed on the screen of the display unit 8 through the image output unit 9. The images from four terminals are simultaneously displayed on the four divided display regions of the screen. As mentioned above, the video images are simultaneously received from four terminals and can be simultaneously displayed on the screen. Although GN has been converted in the above embodiment, the case of changing not only GN but also the information in FH will be described in the next embodiment 2.

In FH in the embodiment 2, a bit indicative of QCIF or CIF is included in PTYPE mentioned above. Therefore, in case of obtaining the image by synthesizing four QCIF, it is necessary to change FH in order to prevent an erroneous operation of a decoder at the post stage.

(Embodiment 2)

Figure 14:
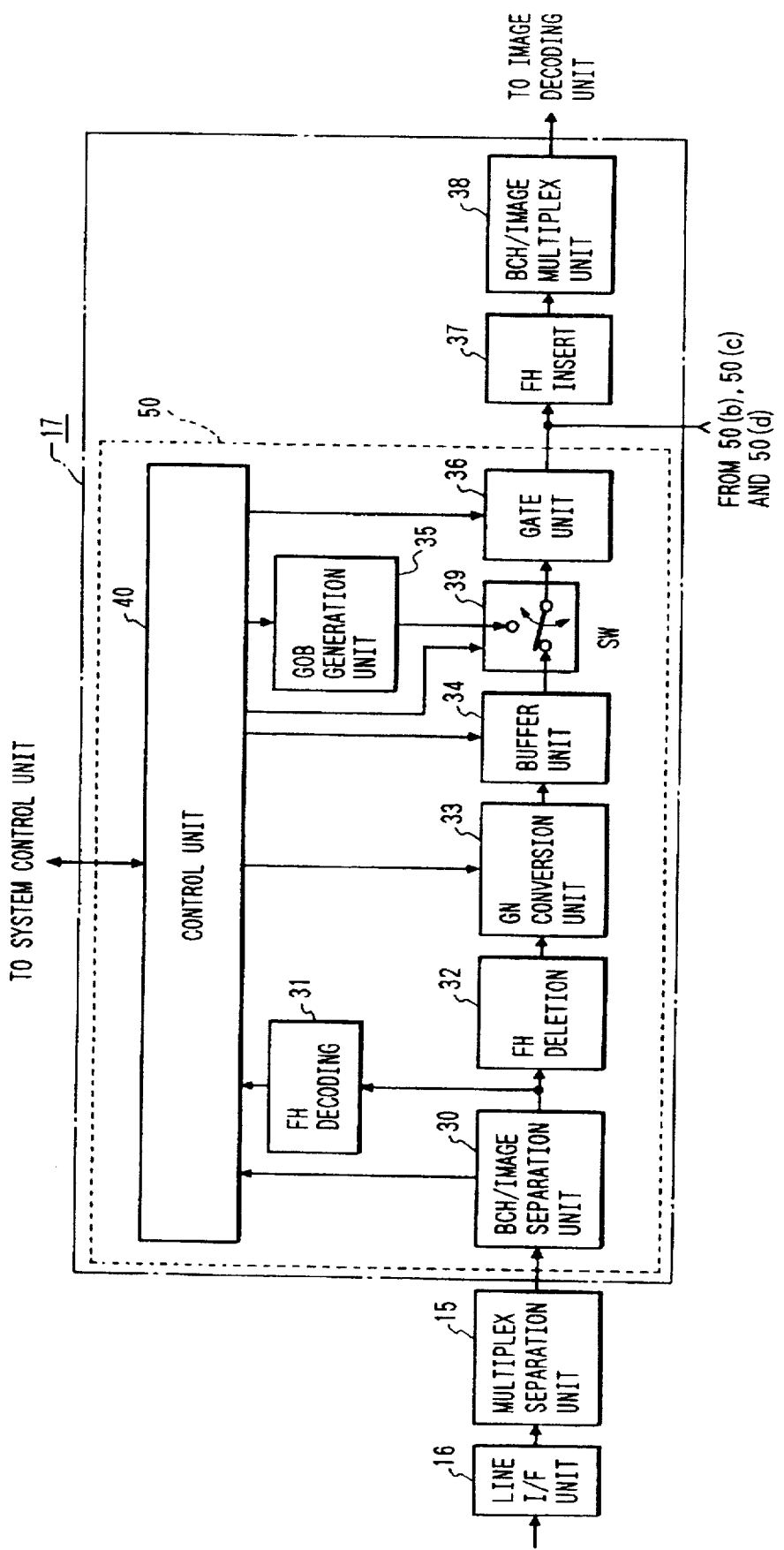
FIG. 14 is a block diagram showing an image control unit according to another embodiment of the invention.

FIG. 14 is a block diagram showing an image control unit according to another embodiment of the invention. In the diagram, reference numeral 30 denotes a BCH/image separation unit for performing an error correcting process of BCH to the data received from the multiplex separation unit 15 and for eliminating the error correction frame, thereby obtaining the image data; 31 an FH decoding unit having a function to decode the frame header (FH) in the image data; 32 an FH deletion unit to delete the FH from the image data; 33 a GN conversion unit to convert GN (GOB Number) in the GOB header in the image data; 34 a data buffer; 35 a GOB generation unit to generate GOB data; 36 a gate unit; 37 an FH insertion unit to insert FH which has been changed to the image data having no FH and to insert FH in which QCIF that is indicated by PTYPE in FH has been changed to CIF; 38 a BCH/image multiplex unit to form an error correction frame by adding a correction parity of BCH; 39 a change-over switch; and 40 a control unit which receives an instruction from the system control unit 14 and controls each of the above units.

The data from the multiplex separation unit 15 corresponds to the error correction frame of the format as shown in FIG. 9 mentioned above.

The BCH/image separation unit 30 performs the synchronization of the multi-frame by the error correction frame bit and executes an error correcting process to the image data by the error correction parity and discriminates whether the image data is valid or invalid by the fill identification data. When the image data is valid, the image data is transferred to the FH deletion unit 32 and is also sent to the FH decoding unit 31.

The FH decoding unit 31 searches FH. When FH is found out, the FH decoding unit 31 starts to decode and notifies the existence of FH to the FH deletion unit 32. In response to such a notification, the FH deletion unit 32 deletes FH. The FH decoding unit 31 notifies the result of the decoding to the control unit 40.

The image data from which FH was deleted by the FH deletion unit 32 is sent to the GN conversion unit 33. The GN conversion unit 33 starts to decode the content of the image data. The image data has the multiplex frame construction as shown in FIG. 10. However, explanation will now be made in a state in which FH is added for convenience of explanation.

The buffer unit 34 stores the image data from the GN conversion unit 33 and asynchronizes the transfer timing. The image data is transferred to the FH insertion unit 37 at the timing of the gate unit 36.

The change-over switch 39 is controlled by the control unit 40. The control unit 40 monitors the present data capacity in the buffer unit 34. When enough data which can be transferred does not exist in the buffer unit 34, the switch 39 switches to the GOB generation unit 35 side, thereby allowing the data to be transferred from the GOB generation unit 35 to the gate unit 36. On the contrary, when enough data which can be transferred exists in the buffer unit 34, the switch 39 switches to the buffer unit 34 side, thereby allowing the data stored in the buffer unit 34 to be sent to the gate unit 36.

The GN value of GOB is instructed to the GOB generation unit 35 from the control unit 40, so that the GOB generation unit generates the GOB corresponding to the GN value. When the change-over switch 39 is switched to the GOB generation unit side, GOB is supplied to the gate unit 36.

In place of FH deleted by the FH deletion unit 32, FH produced by the control unit 40 is inserted by the FH insertion unit 37 to the head of the image data having no FH which has been generated from the gate unit 36. Although the FH insertion unit 37 is unnecessary when the terminal is connected to one point, the FH insertion unit 37 is effective in case of the multipoint connection as will be explained hereinlater.

After the image data has been returned to the original image data by the FH insertion unit 37, the image data is returned to the error correction frame shown in FIG. 9 by the BCH/image multiplex unit 38 and transferred to the image decoding unit 10 (refer to FIG. 1).

Figure 15:
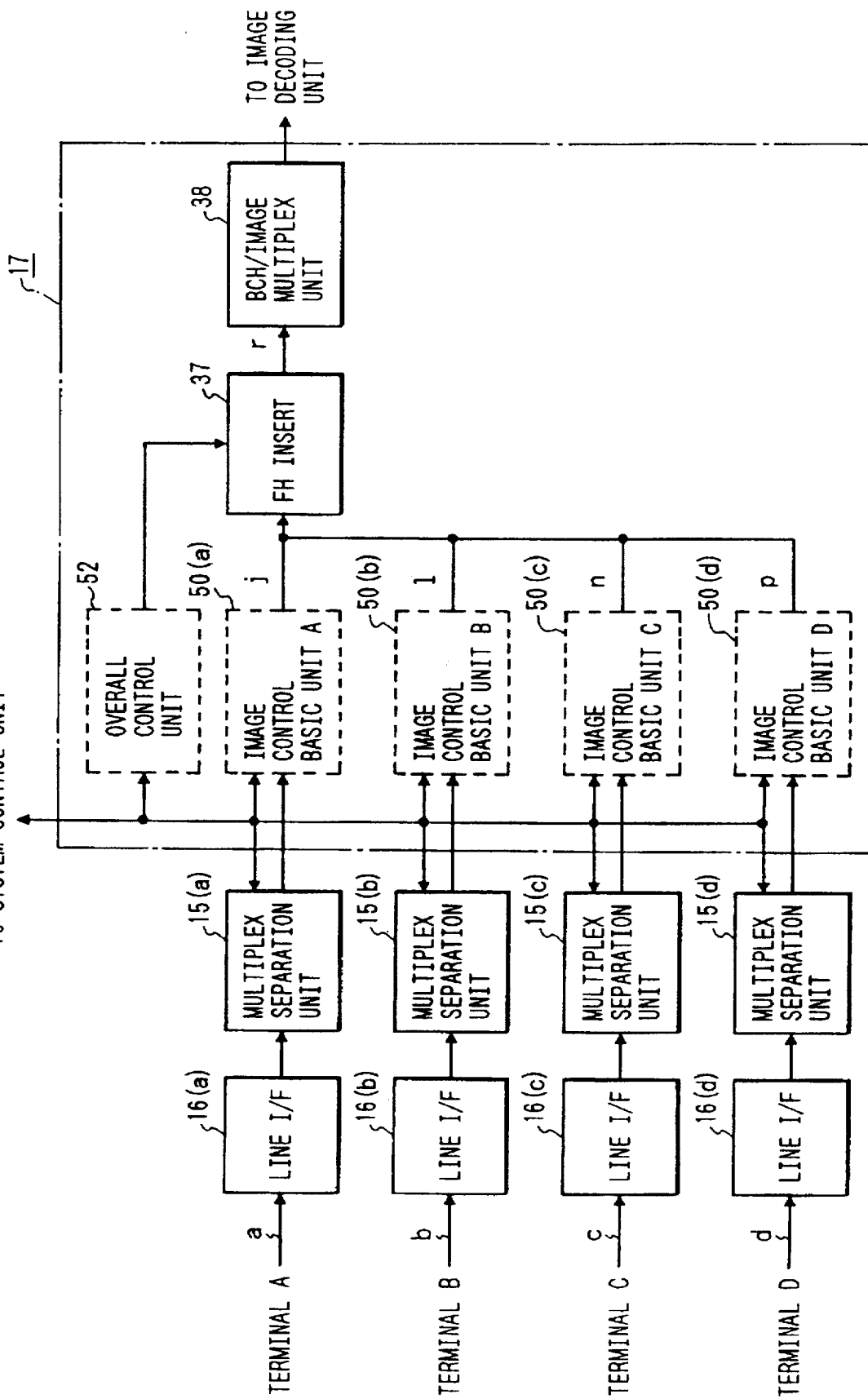
FIG. 15 is a unit diagram of the image control unit shown in FIG. 14.

FIG. 15 shows an example of a construction in the case of simultaneously receiving the image data from four terminals by using a plurality of image control units 17 mentioned above. In the diagram, with respect to the reception image data from the terminal A, the above processes are executed by the line interface unit 16(a), multiplex separation unit 15(a), and image control basic unit A 50(a) because a construction similar to the portion surrounded by a broken line in FIG. 14 is used. Similar processes are also executed to the reception image data of each of the terminals B, C, and D, respectively.

In case of FIG. 15, an overall control unit 52 to control four image control basic units 50(a) to 50(d) is added. However, four image data having no FH of the image control basic units A to D are sent to the gate units by the overall control unit 52 and are time-division multiplexed. Further, the overall control unit 52 instructs the FH insertion unit 37 to add FH to the head of the multiplexed image data. The image data produced as mentioned above is again produced to the error correction frame by the BCH/image multiplex unit 38 and is transferred to the image decoding unit.

By the above method, the reception data from each terminal can be simultaneously processed in parallel.

When the transmission capacity from each terminal is exchanged, the image reception transmission capacity of the self terminal is transmitted as QCIF to the partner terminal and the image data is received in the format of QCIF from the partner terminal. The apparatus is reconstructed so that four QCIF received from four terminals can be enclosed into CIF as shown in FIG. 12A.

For this purpose, the position on the CIF screen at which the image from each terminal is displayed is instructed from the system control unit 14 to the overall control unit 52 and each of the image control basic units 50(a) to 50(d). Each of the image control basic units 50(a) to 50(d) allows the GN value to be converted by the GN conversion unit 33 in accordance with the instruction from the system control unit 14 in a manner similar to the conversion mentioned before.

Figure 16:
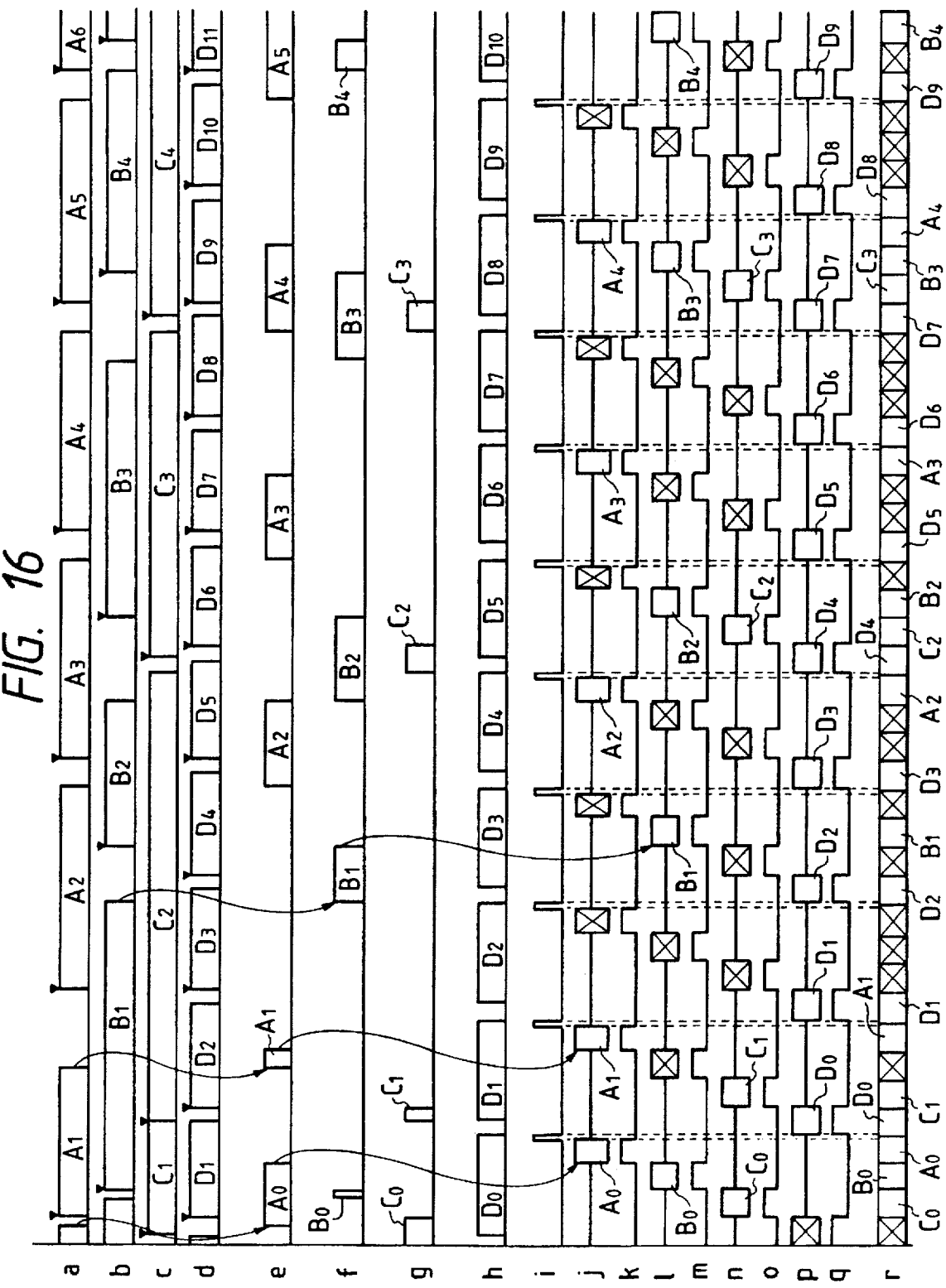
FIG. 16 is a timing chart showing the operation of each image control unit shown in FIG. 15.

FIG. 16 is a timing chart showing the operation of the image control unit. In the diagram, reference characters a, b, c, and d denote image data signals which are transferred from the BCH/image separation unit 30 to the GN conversion unit 33 through the FH deletion unit 32 in each of the image control basic units 50(a) to 50(d). For instance, $A_1$ of the signal a denotes a block of the image data of one frame which has been received from the A terminal. Reference numerals indicate serial numbers. That is, the content of the image data block is constructed by three GOB because the received image data is QCIF.

As for those image data blocks, the GN value is converted by the GN conversion unit 33 as instructed from the system control unit 14 and stored into the buffer unit 34.

Signals e, f, g, and h indicate the timings at which the image data of one picture plane has been stored in the buffer unit 34. For instance, the $A_1$ block of the signal e denotes a state until the transfer of the $A_1$ block to the gate unit 36 is started from a time point of the completion of the storage to the buffer unit 34.

Reference character i denotes a signal which is sent from the overall control unit 52 to the FH insertion unit 37 and indicates the timing to insert FH to the image data frame which has been reconstructed to CIF by multiplexing the image data of QCIF from the image control basic units 50(a) to 50(d). The FH insertion unit 37 inserts FH including the FH information indicated from the overall control unit 52 by the i signal.

k, m, o, and q denote timing signals of the gate units 36 which are included in the image control basic units 50(a) to 50(d). When those signals are set to "H", the data from the buffer unit 34 or GOB generation unit 35 is transferred to the FH insertion unit 37.

Signals j, l, n, and p correspond to the signals k, m, o, and q, respectively and indicate the image data which is transferred from the gate unit 36 to the FH insertion unit 37. The instance, $A_1$ of the signal j indicates an image data block from the buffer unit 34 of the image control basic unit A. A block shown by x denotes that when enough data is not stored in the buffer unit 34 or when it is necessary to shift the timings, the GOB blocks of the lack amount had been generated from the GOB generation unit 35 and the lack amount was compensated.

r indicates an arrangement of the image data generated from the FH insertion unit.

In FIG. 16, the terminal A corresponds to QCIF(D) in FIG. 12A, the terminal B corresponds to QCIF(C), the terminal C corresponds to QCIF(B), and the terminal D corresponds to QCIF(A). Those images are displayed on the screen.

The image data block generated from the GOB generation unit 35 is the GOB block having the same GN as the GN value which has been replaced by the GN conversion unit 33 as a GN value of GOB. As a content of the GOB block, when there is no coefficient data, it is not particularly necessary to add MB. Therefore, the GOB block can be constructed by only the GOB header. However, the next timing can be set by inserting a special meaningless code such as "0000 0001 111" just after the GOB header or just after the MB block. Such a special code is abandoned in the image decoding unit and, in place of it, the image of the previous field is generated as it is.

Further, in the case where two or three terminals are simultaneously communicating, they do not synchronously operate, namely, they asynchronously operate. Therefore, a situation such that a lack amount certainly exists on the screen occurs. Therefore, in the image control basic unit corresponding to the terminal whose synchronization is largely deviated, the change-over switch 39 is always switched to the GOB generation unit 35 side, thereby allowing the GOB block from the GOB generation unit 35 to be always transferred.

As the content of the GOB block in this instance, a special meaningless code as mentioned above can be also used. In this case, however, such a code is abandoned in the decoding unit 10 and the picture plane is not updated. Therefore, in order to clear the screen, coefficient data such as to produce white or black data is added to all of MB and is prepared as an INTRA mode and is periodically transferred. Or, coded data is prepared so that some message is displayed and such coded data is transferred. By the above construction, even if there is a terminal which is not synchronized, it can be preferably synchronized.

The signal r in FIG. 16 is the image data signal generated from the FH insertion unit 37. A black painted portion indicates FH of each frame. As shown in the signal r, three GOB of QCIF of each terminal are multiplexed and 12 GOB of CIF are obtained and transferred to the BCH/image multiplex unit 38.

Although the bit indicative of CIF/QCIF in FH has been converted in the above embodiment, the images of a plurality of QCIF can be preferably synthesized irrespective of the kind of decoder.

In the image coding unit 10, the image data is decoded as a format of CIF and the decoded image is transmitted through the image output unit 9 and is displayed on the screen of the display unit 8. The images from four terminals are simultaneously displayed on four divided display regions of the screen. As mentioned above, the video images from four terminals are simultaneously received and can be simultaneously displayed on the screen.

(1) As described above, according to the embodiment, when images are simultaneously mutually communicated among multipoints, such a communication can be realized by merely preparing one image decoding unit although the decoding units of the number which is equal to only the number of terminals which simultaneously communicate must have conventionally been prepared.

Therefore, the number of decoding units can be reduced by only the number of terminals which are added. Further, a plurality of picture planes which are transmitted can be synthesized by, for example, merely controlling the change of the GOB header. Therefore, particularly, an additional processing unit for synthesizing picture planes is also unnecessary.

Since each image is reduced into 1/N (N is the maximum number of terminals which can communicate) of the full size by the transmission terminal and is transmitted, when the picture planes are synthesized, it is also unnecessary to execute a reduction editing process of the image.

Further, when a plurality of decoding units are prepared and the images are synthesized, after the images are decoded and synthesized, the synthesized image is again coded, so that the image is deteriorated. However, the invention has an advantage such that the images do not deteriorate since the picture planes are synthesized without being decoded.

Consequently, a special effect, such that a system construction of the terminals can be remarkably reduced without reducing the function, is obtained.

(2) According to the embodiment, when images are simultaneously mutually communicated among multipoints, the partner terminal can control the image format by an ordinary procedure and can simultaneously communicate from the self terminal to the transmission terminal without being aware of a fact that the self terminal is connected to multipoints.

Therefore, the terminal can communicate so long as it conforms with the ordinary standards. The transmission terminal side does not need a special procedure for the multipoint connection.

Consequently, there is an effect such that the cost performance of the system is extremely improved by adding the function to mutually communicate among the multipoints to the system without an increase in costs due to the change in system construction and the change in function of the other transmission terminal.

Further, the vain transmission capacity is also eliminated and there is also an effect of reduction of communication costs.

(3) Moreover, even in the case where the transfer rate of each frame of the image data from a plurality of terminals differs, the lack amount can be compensated. Therefore, the image data can be simultaneously received by the decoding unit without causing an erroneous operation and can be communicated without any restricting condition upon connection with multipoints independently of the transmission terminal. Thus, there is an effect such that the communications among multipoints can be cheaply constructed while keeping the ordinary construction of the terminals and system.

(4) According to the embodiments, further, even in the case where the number of terminals which simultaneously communicate does not reach the maximum number N of terminals, the lack amount can be compensated. Therefore, the image data can be simultaneously received without causing an erroneous operation in the decoding unit and the mutual communication can be performed without any restricting condition upon connection among multipoints independent of the transmission terminal. There is, consequently, an effect such that the communication among multipoints can be cheaply constructed while keeping the ordinary construction of the terminals and system.

On the other hand, since it is also possible to construct in a manner such that the images to clear the picture planes are prepared and the picture planes of the lack amount are cleared, a situation such that the preceding input image is displayed as it is without being updated is also eliminated. By preparing images of messages of a fixed size and displaying on the lack picture planes, a fact that the inherent images are not received can be also informed to the operator. There is, consequently, an effect such that the use efficiency of the man/machine interface is improved.

In the above embodiments, the compressed data which had been received from multipoints has been synthesized and processed without decoding. However, the invention can be also applied to an apparatus such that both of the image data and the control data associated with the image data are received from a single point without receiving data from multipoints and the control data is changed.

What is claimed is:

1. An image processing apparatus comprising:
   a) input means for inputting image data, coded by a predetermined compression coding method, from a plurality of external devices, wherein said predetermined compression coding method comprises a block-coding method in which an image is divided into blocks each having a predetermined size and then coded on a block unit basis;
   b) generating means for generating coded image data for one frame by synthesizing, on the block unit basis, the plurality of coded image data inputted by said input means without decoding the plurality of coded image data; and
   c) decoding means for decoding the coded image data for one frame generated by said generating means.

2. An apparatus according to claim 1, wherein the coded image data is obtained by coding image data by an orthogonal transformation.

3. An apparatus according to claim 1, wherein the coded image data inputted by said input means is reduced image data.

4. An apparatus according to claim 1, further comprising output means for outputting image data decoded by said decoding means to a display unit.

5. An apparatus according to claim 1, wherein said input means inputs control data related to the coded image data together with the coded image data.

6. An apparatus according to claim 5, further comprising changing means for changing the control data.

7. An apparatus according to claim 6, wherein the control data comprises data indicating a format of the inputted coded image data.

8. An apparatus according to claim 7, wherein the coded image data inputted by said input means comprises a signal of a QCIF format, and wherein said generating means generates coded image data of a CIF format by gathering the coded image data of the QCIF format.

9. Apparatus according to claim 6, wherein the control data comprises data indicating a position in which the image data is displayed.

* * * * *

UNITED STATES PATENT AND TRADEMARK OFFICE
CERTIFICATE OF CORRECTION

PATENT NO. : 5,675,393
DATED : October 7, 1997
INVENTOR(S) : MAKOTO CHIDA

It is certified that error appears in the above-identified patent and that said Letters Patent is hereby corrected as shown below:

Title page,

At [56] U.S. Patent Documents

Insert:

| | | | |
|---|---|---|---|
| 4,650,929 | 03/17/87 | Boerger, et al. | 358/85 |
| 4,931,872 | 07/05/90 | Stoddard, et al. | 358/183 |
| 4,965,819 | 10/23/90 | Kannes | 379/53 |
| 4,996,592 | 02/26/91 | Yoshida | 358/85 |
| 4,734,767 | 03/29/88 | Kaneko, et al. | 348/400 |

Title page,

At [56] U.S. Patent Documents

"Tsutameri et al." should read --Tsutamori et al.--.

Column 1

Line 61, "self terminal" should read --self-terminal--

Column 16

Line 18, "Apparatus" should read --An apparatus--.

Signed and Sealed this

Fourth Day of April, 2000

Attest:

*Attesting Officer*

Q. TODD DICKINSON

*Director of Patents and Trademarks*